Feb. 19, 1946.                W. A. SCHULZE                 2,395,198
              ALKYLATION AND OLEFIN RECOVERY PROCESS
                        Filed Oct. 5, 1942
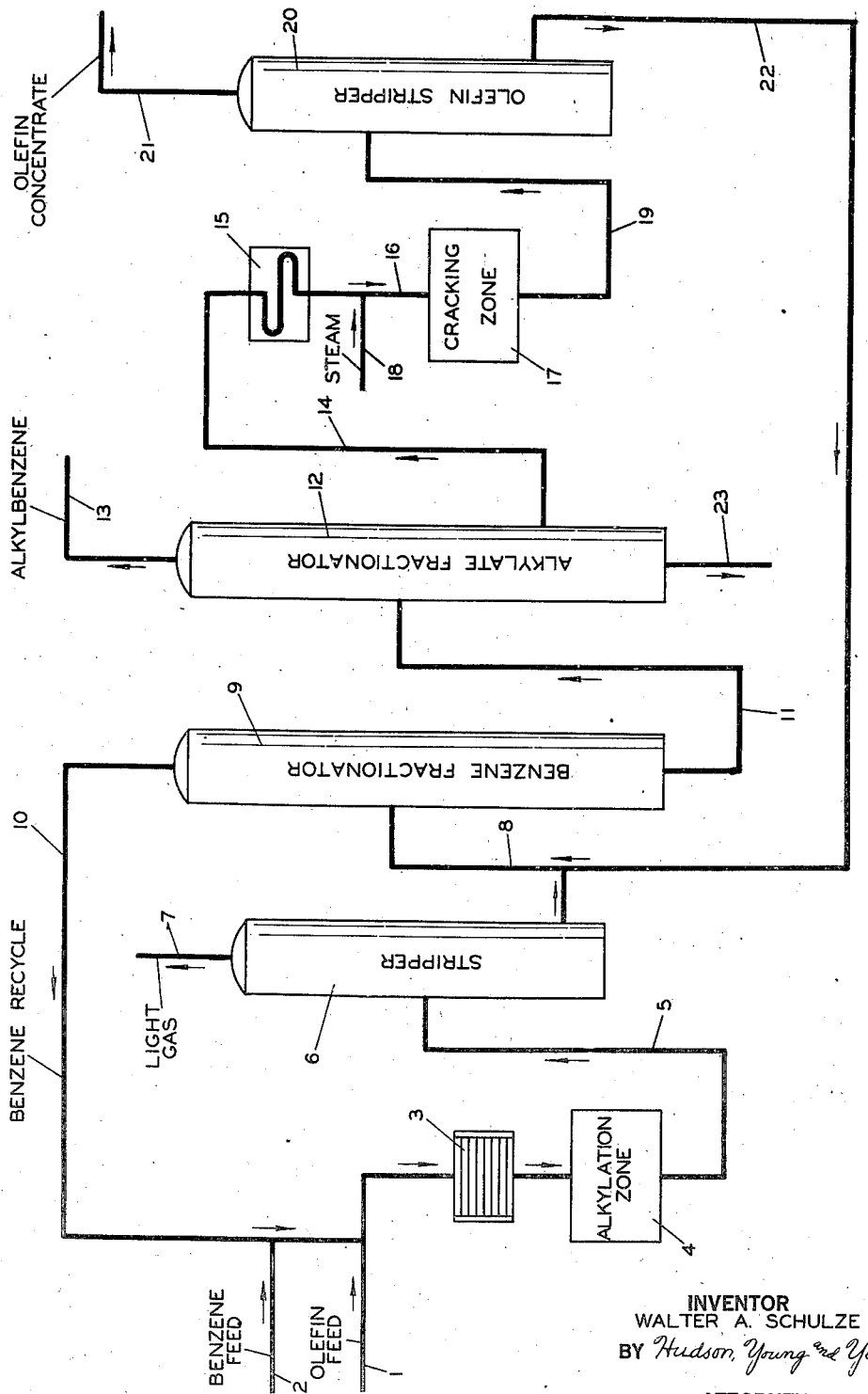
INVENTOR
WALTER A. SCHULZE
BY Hudson, Young and Yinger
ATTORNEYS Patented Feb. 19, 1946

2,395,198

UNITED STATES PATENT OFFICE 2,395,198

ALKYLATION AND OLEFIN RECOVERY PROCESS

Walter A. Schulze, Bartlesville, Okla., assignor to Phillips Petroleum Company, a corporation of Delaware Application October 5, 1942, Serial No. 460,848

5 Claims. (Cl. 260—671)

This invention relates to the alkylation of benzene with olefins to form alkylbenzenes. More specifically, this invention relates to a process for the catalytic alkylation of benzene with low-boiling aliphatic olefins of three or more carbon atoms forming both mono- and poly-alkyl derivatives. The invention has for particular features the control of the alkylate composition and the treatment of the alkylate to produce both alkylbenzenes and high purity olefins by a catalytic cracking step applied to the poly-alkyl-derivatives.

One object of this invention is to provide a process for the production of alkylbenzenes in improved yields utilizing olefin feed stocks of relatively low olefin concentrations.

Another object of this invention is to improve the efficiency of alkylation processes producing alkylbenzenes by converting by-product poly-alkylbenzenes to mono-alkylbenzenes.

Still another object of this invention is to provide a process capable of yielding both alkylbenzenes and olefin concentrates with the relative amounts controllable through conditions in the alkylation and/or catalytic cracking steps.

In the alkylation of benzene with olefins or compounds capable of yielding olefins, a succession of reactions may occur whereby the products comprise a mixture of compounds including mono-, di-, and tri-alkyl derivatives. In such mixtures, the mono-alkylbenzenes often predominate, but the poly-alkylbenzenes are usually present to an extent dependent on the equilibrium reached under chosen alkylation conditions.

Various methods may be employed to control the composition of the alkylate in accordance with efficient process operations. For example, in order to suppress the formation of poly-alkyl derivatives, more selective catalysts may be chosen in preference to those producing very complex mixtures, and large molar excesses of benzene may be provided in the alkylation feed mixture. Other expedients, such as the use of olefins in relatively pure form to minimize the severity of reaction conditions and/or operation with a low per pass utilization of the olefin, have been tried for the purpose of decreasing poly-alkylation.

The use of selective catalysts has obvious economic advantages, particularly since such catalysts are often least expensive with regard to original cost, length of service, and the hydrocarbon purification steps required for the alkylate. The other methods, however, may increase equipment requirements and operating costs without a compensating reduction in the quantities of poly-alkylbenzenes produced.

Various dealkylation procedures have also been suggested wherein poly-alkylbenzenes are returned to the alkylation zone or are mixed with excess benzene and subjected to treatment over an alkylation catalyst in a separate zone. This treatment is designed to produce mono-alkyl derivatives by rearrangement or relocation of the alkyl groups. However, when such dealkylation is attempted in the same zone with the benzene-olefin reaction, both reactions are penalized because compromise conditions must be employed which are not the optimum conditions for either conversion. The separate dealkylation operation is often more efficient, but may require relatively large sized equipment for the volume of mono-alkylbenzenes recovered.

I have now discovered a more efficient process for alkylating benzene with olefins of at least three carbon atoms which enables the production of higher yields of mono-alkyl derivatives, and at the same time permits the recovery of the olefins consumed in the production of poly-alkyl derivatives in highly concentrated form. The steps of the process are also adaptable to various adjustments of the ratio of mono- to poly-alkylated products so that the relative yields of the final products may be adjusted to economic requirements.

The steps of this process may be illustrated by reference to the drawing which is a flow diagram of one arrangement of conventional units of equipment suitable for the practice of the invention.

In the drawing an olefin-containing feed stream is passed through line 1, combined with benzene from line 2, and the mixture passes through heat exchanger 3 to alkylation zone 4 containing an alkylation catalyst. In zone 4 alkylbenzenes are formed and the products pass through line 5 to stripper 6 where low-boiling unreacted components of the olefin-containing feed are separated and removed through line 7. The liquid alkylation products then pass through line 8 to column 9 where benzene is separated as an overhead product and recycled through line 10 to the benzene feed line 2.

Alkylate leaving benzene column 9 through line 11 passes to alkylate fractionator 12 where mono-alkylbenzenes are taken overhead to product storage while poly-alkylbenzenes are taken through line 14 to the subsequent catalytic cracking step.

The higher boiling alkylate passing through line 14 is heated and vaporized in heater 15, and the vapors pass through line 16 to cracking zone 17 containing a suitable cracking catalyst. If desired, a diluent, preferably steam, may be added to the vapor feed ahead of (as by means of line 18) or within the cracking zone.

Cracked products from zone 17 pass through line 19 to stripper 20 where low-boiling olefins are separated from the liquid products and removed by line 21 to olefin storage or utilization elsewhere. The liquid cracked products comprising the compounds resulting from splitting off one or all alkyl side chains from the poly-alkylated benzenes then are returned through line 22 to line 8 ahead of the benzene column 9. In this column and in fractionator 12, the benzene and mono-alkylbenzenes produced by cracking are segregated along with the corresponding products from the alkylation step, and unconverted poly-alkyl compounds are recycled to the cracking step along with fresh feed heavy alkylate. Traces of refractory material formed in the cracking step may be accumulated and withdrawn through kettle drain 23 of fractionator 12. Other modifications of the flow diagram may, of course, be devised, but the foregoing represents a very efficient arrangement utilizing the same fractionating equipment for both steps so as to minimize plant requirements. The relative volumes handled in the two process steps will vary with the alkylate composition, but, in general, the cracking step illustrated treating only poly-alkylated benzenes will produce maximum amounts of olefins and other products from relatively small volumes of feed.

Operating conditions in the alkylation step will depend on the catalyst employed, the nature and concentration of the olefin feed, the aromatic-olefin molar ratio in the alkylation feed and the desired composition of the alkylate. Optimum conditions may be determined experimentally for specific situations in the light of the accompanying general discussion.

The alkylation is preferably carried out in the presence of a catalyst active under mild temperature and pressure conditions and which does not require extensive catalyst separation and/or hydrocarbon purification steps. Thus, such conventional catalysts as sulfuric acid, phosphoric acid, aluminum chloride, zinc chloride, and the like may be used, or it may be advantageous to employ a catalyst of the group comprising hydrofluoric acid, organic or inorganic complexes of boron trifluoride, and solid contact catalyst of special characteristics. Often great economy and efficiency in operation are obtained through the use of solid catalysts consisting of synthetic silica gel activated with minor proportions of alumina and/or zirconia. These preferred catalysts are adaptable to substantially complete olefin utilization of olefins in even relatively dilute mixtures with a minimum of sludge and polymer formation.

The olefin feed may be obtained from any suitable source such as petroleum cracking or dehydrogenation operations, the dehydration of alcohols, or other direct or indirect supply. Olefin-containing stocks from associated petroleum conversion processes are ordinarily given preliminary treatment to segregate compounds of the same number of carbon atoms. This segregation is necessary to avoid alkylation with mixtures of different olefins, although in certain cases the handling of such mixtures may be desirable.

The olefin-containing feed stocks are usually paraffin-olefin mixtures, such as propane-propylene, butane-butylene or pentane-pentylene fractions produced by fractional distillation or condensation. The amounts of impurities such as diolefins, acetylenes, etc. are usually kept very low, or such impurities may be removed entirely by preliminary purification ahead of the process.

The olefin-containing feed is mixed with benzene in a predetermined molar ratio, selected on the basis of desired alkylate composition and favorable to relatively complete olefin utilization. In most cases sufficient benzene is included to represent a molar benzene-olefin ratio greater than about 1:1. The provision of excess benzene may be utilized within limits to increase the proportion of mono-alkylated product, or its main function may be to suppress polymerization of some of the more reactive olefins. Polymer formation is undesirable both because of the olefin loss and because the subsequent separation steps may be more difficult.

When suitable provision has been made for limiting the olefin concentration to suppress polymerization, further increases in the benzene concentration may or may not be desirable. Efficient feed ratios are usually in the range of about 1:1 to about 4:1, with the choice depending to a large extent on the type of catalyst employed. Low benzene-olefin molar ratios are often used when it is desirable to increase the production of poly-alkylated products.

The temperature and pressure of alkylation will depend on the catalyst employed as will the flow rate or contact time of hydrocarbons with the catalyst. Where possible the hydrocarbon stream is often maintained in liquid phase, although the lower-boiling olefins may be added as gases to benzene-liquid catalyst mixtures, or even passed in vapor or mixed phase with benzene over solid catalysts. Since the activity of the various catalysts and the conditions under which they are used are obviously different, broad generalizations on operating conditions are not possible. Specific illustrations, however, are provided in subsequent exemplary operations, and the use of conventional catalyst will be familiar to those skilled in the art of alkylation.

The reaction mixture from the alkylation zone is first stripped of light components of the olefin feed stream, with olefin-denuded gases being vented or returned to associated processes such as for further production of olefins. The liquid product is then fractionated to remove unreacted benzene for recycle to the alkylation step. This fractionation may be carried to complete benzene removal if desired in order to produce high purity alkylbenzenes.

The alkylate from the bottom of the benzene column is next fractionated to separate mono-alkylbenzene from poly-alkyl derivatives. Due to the wide difference in boiling points between the corresponding mono- and di-alkyl compounds, this separation may be readily accomplished in order to process only the higher boiling alkylate in the cracking step. However, treatment of some of the mono-alkylbenzene in the cracking step merely increases olefin recovery at the expense of alkylbenzene production.

The poly-alkylbenzenes are next sent to the cracking zone after being vaporized and heated in one or more steps to cracking temperature. The heated vapors are contacted with a catalyst which is highly specific in splitting off one or more of the alkyl side chains to produce the corresponding olefins. In this highly selective conversion, temperature, pressure, and contact time are carefully chosen to produce maximum yields of olefins, benzene and/or partially de-alkylated compounds, with the benzene and other aromatics being returned for further use on the process. Mono-alkylbenzenes produced are recovered in the refractionation of the cracked products.

The conversion taking place in the cracking zone may be exemplified by the following equations:

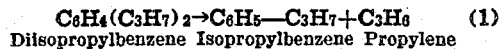
Diisopropylbenzene Isopropylbenzene Propylene

Isopropylbenzene Benzene Propylene

When the alkyl group contains three or more carbon atoms, the reaction of Equation 1 usually proceeds very rapidly even under relatively mild cracking conditions. The rate of the reaction of Equation 2 apparently increases somewhat with increasing size of the alkyl group, but, more particularly, with increasing concentration of the mono-alkylbenzene as a result of the first reaction. Thus, the net products of the conversion depend mainly on the depth of conversion and the size (number of carbon atoms) of the alkyl sidechain.

While optimum cracking conditions may vary with each family of compounds, satisfactory conversion over preferred catalysts is ordinarily obtained at temperatures in the range of about 600 to about 1000° F. Operation within these limits may be readily adjusted to favor high yields of either mono-alkylbenzenes or of olefins.

Pressures in the cracking step are usually maintained at low values to favor the cracking reaction and to suppress fragmentation, hydrogenation, polymerization or other undesirable side reactions which may involve the relatively reactive olefins. In most cases low near-atmospheric pressures of about zero to about 100 pounds gage are satisfactory and maintain the flow of vapors through cracking and auxiliary equipment. Subatmospheric pressures may be employed if required to facilitate vaporization of the very high boiling poly-alkylbenzenes, although operational difficulties are usually increased.

Flow rates are chosen to conform to temperature conditions in the interest of reaction efficiency at a satisfactory per pass conversion. Thus, within limits, higher temperatures may require higher flow rates to suppress over-conversion with attendant coking of the catalyst and destruction of reaction products. Flow rates of about 1 to about 10 liquid volumes of alkylbenzene per volume of catalyst per hour are satisfactory in most cases.

While a number of recognized types of solid adsorbent cracking catalysts may be utilized in the cracking zone, those most active and specific at moderate temperatures are certain silica-alumina compositions which may be considered the preferred catalysts. These silica-alumina catalysts are predominantly silica in highly adsorbent form, activated with minor amounts of alumina. Other metal oxides such as zirconia and titania may also be present in small amounts along with the silica and alumina. These catalysts are often synthetic preparations of the gel type formed by precipitation from suitable aqueous salt solutions by means known to the art, and carefully dried and activated to retain their structure and adsorbent characteristics.

Other types of silica-alumina catalysts may be prepared from naturally-occurring minerals such as zeolites and clays by acid treatment to remove ferrous impurities and the like and to adjust the silica-alumina ratio, although such preparations are usually less active than the preferred catalysts and require higher cracking temperatures. Certain natural clays of low iron content are also usable without chemical treatment, although their activity is low compared to the preferred synthetic gel-type catalysts.

Bauxite, preferably of low iron content, is active in a somewhat higher temperature range than the synthetic silica-alumina catalysts, and while satisfactorily specific in the original splitting reaction, also promotes a degree of rearrangement and branching of the carbon skeleton in $C_4$ and higher olefins. This side reaction is useful in cases where the production of isobutylene, etc. is advantageous. Synthetic alumina preparations require still higher temperatures, and in the case of the higher olefins, produce somewhat more fragmentation of the olefin and light gas formation.

It is generally desirable to operate the cracking step at temperatures and reaction conditions which are least conducive to coke and carbon formation. This suppression of coking not only prolongs catalyst service between reactivations, but also reduces the production of hydrogen in the light gas formed during cracking. The latter effect is of great importance in further reducing the hydrogenation of olefins in the cracked products and in producing higher purity olefin products.

Coke formation and over-conversion at high temperatures may often be suppressed by the addition of a diluent to the feed stock to the cracking step. Such diluents are relatively inert at reaction conditions and should also be easily separable from the reaction products to avoid contamination of either olefin products or the recycled aromatic hydrocarbons. A preferred diluent is steam which may be added at the proper temperature level ahead of the catalyst and condensed from the reaction products in subsequent stages. Other possible diluents include nitrogen, carbon dioxide, and methane, all of which are suitably inert and easily separable from the olefins of three or more carbon atoms.

When a cracking catalyst becomes deactivated during use, reactivation is accomplished by burning off carbonaceous deposits to restore the original activity. Mixtures of air and inert gas are ordinarily employed for the reactivation step, with the oxygen content controlled to prevent subjecting the catalyst to temperatures which impair the physical structure and the activity. In the reactivation of synthetic silica-alumina compositions, temperatures above about 1100° F. are usually avoided, while with other catalysts, such as bauxite and clay, somewhat higher temperatures up to about 1300° F. are permissible.

The following examples will serve to illustrate specifically the operation of the process, particularly with regard to specific alkylation catalysts and alkylation conditions and to specific cracking catalysts and products obtained in each step of the process. However, these examples are not to be considered as limitations of the process since a great many modifications and possible applications will be evident in view of the scope and teachings of this disclosure.

*Example 1*

Benzene was alkylated with propylene by mixing the benzene and propylene feeds to produce a molar benzene-propylene ratio of 1.5:1 and passing the liquid mixture over a solid type alkylation catalyst at 300° F., 400 pounds gage pressure, and a flow rate of two volumes per volume of catalyst per hour. The catalyst was granular synthetic silica gel activated with a minor proportion of alumina, and the propylene feed stock contained about 70 volume per cent of propylene.

The alkylation products were stripped to remove unreacted propane from the feed mixture, and the liquid products were fractionated first to remove unreacted benzene and second to separate isopropylbenzene from diisopropylbenzene. The alkylate contained 61 weight per cent isopropylbenzene and 39 weight per cent diisopropylbenzene equivalent to 68 mols isopropylbenzene and 32 mols diisopropylbenzene per 100 mols of benzene in the alkylation step.

The diisopropylbenzene was vaporized admixed with steam in a steam-hydrocarbon molar ratio of 2:1 and cracked over low iron fuller's earth at 850° F. The per pass conversion was 60 weight per cent of the diisopropylbenzene with ultimate yields as follows:

| Product | Mols/100 mols diisopropylbenzene converted |
| --- | --- |
| Benzene | 62.5 |
| Isopropylbenzene | 37.5 |
| Propylene | 156 |

The propylene was recovered as a C₃ concentrate containing 96.5 mol per cent propylene.

The overall yields from the process, based on the original feed to the alkylation step and the recovered benzene from both steps available for recycle, showed over 99 per cent conversion of benzene to isopropylbenzene, and the recovery of propylene concentrate in the ratio of 65 mols per 100 mols of isopropylbenzene produced.

*Example 2*

An alkylation feed was prepared by mixing benzene with a C₄ hydrocarbon fraction containing 32 mol per cent normal butylenes. The benzene-butylene molar ratio was 1.11:1. This feed was passed into a reaction zone containing a complex of boron trifluoride and orthophosphoric acid at 120° F. and 70 pounds gage pressure for a reaction time of 20 minutes. Substantially complete reaction of the butylenes resulted.

The alkylate was first stripped of C₄ paraffins, then fractionated to remove unreacted benzene amounting to about 30 weight per cent of the benzene charged. The benzene-free alkylate was then fractionated to recover sec-butylbenzenes. This fractionation yielded 73.5 weight per cent of sec-butylbenzene and 26.5 weight per cent of poly-alkylate which was almost entirely di-sec-butylbenzene. The yields of alkylate were equivalent to 55.5 mols sec-butylbenzene and 14.5 mols di-sec-butylbenzene per 100 mols of benzene converted in the alkylation step.

The di-sec-butylbenzene fraction was vaporized, heated to 750° F. and cracked over silica-alumina catalyst at five pounds gage pressure and a flow rate of 1.5 liquid volumes per volume of catalyst per hour. The per pass conversion was nearly 90 weight per cent of the charge with ultimate yields as follows:

| Product | Mols/100 mols of di-sec-butylbenzene converted |
| --- | --- |
| Benzene | 52 |
| Sec-butylbenzene | 48 |
| Butylenes | 145 |

The butylenes were recovered as a C₄ concentrate containing 95.5 mol per cent of butylenes.

Combined process yields calculated on the basis of the original feed to the alkylation step and recycle benzene from both steps showed almost quantitative conversion of benzene to sec-butylbenzene. The butylene concentrate recovered amounted to about 35 mols per 100 mols of sec-butylbenzene produced.

I claim:

1. The process of recovering a concentrated aliphatic olefin of at least three carbon atoms per molecule from a feed stock containing said olefin in low concentration in admixture with a paraffin and simultaneously preparing the corresponding mono-alkylbenzene which comprises passing a mixture of said olefin-containing feed stock with benzene over an alkylation catalyst and thereby effecting combination of the olefin content of said feed stock with benzene to form the corresponding mono-alkylbenzene and poly-alkylbenzenes, passing the alkylation effluent to a stripping zone and there separating the low-boiling unreacted components of said olefin-containing feed stock from said effluent, fractionating the residual stream from said stripping step to separate overhead the unreacted benzene, recycling said unreacted benzene so separated to said alkylation step, fractionating the benzene-free stream resulting from said fractionating step to separate overhead the mono-alkylbenzene content thereof from said poly-alkylbenzenes, vaporizing and heating to cracking temperature said poly-alkylbenzenes resulting from said last-named fractionating step and passing same over a cracking catalyst and thereby cracking the same to mono-alkylbenzene, benzene and the corresponding olefin as the principal reaction in the cracking zone, fractionating the cracking effluent to separate overhead the olefin content thereof in highly concentrated form, and mixing the resulting olefin-free cracking effluent with said residual stream from said stripping step and treating the resulting mixture in the steps specified as being subsequently applied to said residual stream.

2. The process of claim 1 in which said olefin-containing feed stock consists of a low-boiling paraffin of at least three carbon atoms per molecule and the corresponding aliphatic olefin and is free from diolefins and acetylenes.

3. The process of claim 1 in which said benzene is present in the charge to said alkylation step in an amount such as to give a ratio of benzene to said olefin in the range of from 1:1 to 4:1.

4. The process of claim 1 in which said cracking step is carried out at from 600 to 1000° F. at a pressure of from 0 to 100 pounds gage and at a flow rate of from 1 to 10 liquid volumes of poly-alkylbenzene per volume of catalyst per hour over a catalyst consisting of synthetic silica gel activated with a minor proportion of alumina.

5. A process for the recovery of olefins partially in the form of mono-alkyl benzene and partially in the form of an olefin concentrate from a hydrocarbon mixture of a low-boiling olefin of at least three carbon atoms per molecule and a paraffin which comprises admixing said mixture of olefin and paraffin with benzene, treating the resulting mixture with an alkylation catalyst under such conditions that said olefin is reacted with said benzene and converted to alkyl side chains on the benzene nucleus forming mono-alkyl benzene and poly-alkyl benzene, recovering said mono-alkyl benzene from the alkylation reaction mixture as one product of the process, separately recovering said poly-alkyl benzene from the alkylation reaction mixture, treating said poly-alkyl benzene in the absence of benzene with a dealkylation catalyst under such conditions that dealkylation of said poly-alkyl benzene to benzene and mono-alkyl benzene and olefin corresponding to the olefin contained in the original mixture takes place as the principal reaction, recovering said olefin in concentrated form from the dealkylation reaction mixture as another product of the process, recovering said benzene from the dealkylation reaction mixture and recycling same to said alkylation step.

WALTER A. SCHULZE.